US012646107B2

(12) United States Patent
Kawahara et al.

(10) Patent No.: US 12,646,107 B2
(45) Date of Patent: Jun. 2, 2026

(54) GRAPH FEATURE BASED SYSTEM FOR FLOW MANAGEMENT

(71) Applicant: International Business Machines Corporation, Armonk, NY (US)

(72) Inventors: Ryo Kawahara, Toshima-ward (JP); Mikio Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 18/080,851

(22) Filed: Dec. 14, 2022

(65) Prior Publication Data

US 2024/0202814 A1     Jun. 20, 2024

(51) Int. Cl.
*G06Q 40/02* (2023.01)
*G06F 16/901* (2019.01)

(52) U.S. Cl.
CPC ......... *G06Q 40/02* (2013.01); *G06F 16/9024* (2019.01)

(58) Field of Classification Search
CPC ............................ G06Q 40/02; G06F 16/9024
USPC ........................................................ 707/798
See application file for complete search history.

(56) References Cited

U.S. PATENT DOCUMENTS

| | | | | |
|---|---|---|---|---|
| 11,194,633 | B2 * | 12/2021 | Anderson | ........... G06F 11/2094 |
| 2009/0141028 | A1 | 6/2009 | Arora | |
| 2013/0103580 | A1 * | 4/2013 | Ventura | ................. G06Q 40/12 705/40 |

| | | | | |
|---|---|---|---|---|
| 2014/0019169 | A1 * | 1/2014 | Conroy | ................. G06Q 40/08 705/4 |
| 2017/0147729 | A1 * | 5/2017 | Svizhenko | .............. G06F 30/36 |
| 2018/0174060 | A1 * | 6/2018 | Velez-Rojas | ............. G06N 5/02 |
| 2018/0232916 | A1 * | 8/2018 | Balmin | ................. G06T 11/206 |
| 2019/0196853 | A1 * | 6/2019 | Koblents | ............ G06F 11/3442 |
| 2020/0302552 | A1 | 9/2020 | Rephlo | |
| 2021/0082050 | A9 * | 3/2021 | Mozeika | ............... H04L 63/102 |
| 2021/0150259 | A1 * | 5/2021 | Dasgupta | .............. G06F 18/217 |
| 2021/0319014 | A1 * | 10/2021 | Wang | .................. G06F 16/9035 |
| 2022/0043675 | A1 * | 2/2022 | Xia | ......................... G06F 9/5038 |
| 2022/0108075 | A1 * | 4/2022 | Kehler | .................. G06N 3/047 |
| 2022/0222254 | A1 * | 7/2022 | Ziauddin | ........... G06F 16/24535 |
| 2022/0229903 | A1 * | 7/2022 | Manevitz | ................ G06F 17/16 |
| 2022/0303246 | A1 * | 9/2022 | Miriyala | ................. G06F 21/53 |

(Continued)

FOREIGN PATENT DOCUMENTS

CN            114090860 A  *  2/2022

OTHER PUBLICATIONS

Ryo Kawahara and Mikio Takeuchi. Cash Flow Prediction of a Bank Deposit Using Scalable Graph Analysis and Machine Learning. In 2021 IEEE International Conference on Big Data (Big Data) Dec. 15, 2021 (pp. 1647-1656). IEEE. (Grace Period Disclosure).

(Continued)

*Primary Examiner* — Mark E Hershley
*Assistant Examiner* — Antonio J Caiado
(74) *Attorney, Agent, or Firm* — CHIP LAW GROUP

(57) ABSTRACT

Input data is obtained and converted into a graph. Based on the converted input data, a time series of snapshot graphs is generated by selecting edges whose timestamps are in a given time window for each of a plurality of time windows, each edge having a corresponding attribute. Internal flow probabilities are computed for each snapshot graph of the time series of snapshot graphs and a system is controlled based on the internal flow probabilities.

17 Claims, 8 Drawing Sheets

(56) References Cited

U.S. PATENT DOCUMENTS

| | | | | |
|---|---|---|---|---|
| 2023/0351215 A1* | 11/2023 | Sun | ..................... | G06N 5/022 |
| 2023/0385085 A1* | 11/2023 | Singh | ..................... | G06N 7/01 |

OTHER PUBLICATIONS

Anonymous. "Cash Flow Forecasting Module." Published in 2018 by Finastra. 2 pages. https://www.finastra.com/sites/default/files/documents/2018/03/brochure-fusion-cash-management-cash-flow-forecasting.pdf.

Anonymous. "IEEE BigData 2021." Published Dec. 15, 2021 by IEEE. 1 page. Evidence of Grace Period Use or Sale. https://bigdataieee.org/BigData2021/.

Anonymous. "Light GBM." Accessed Jul. 21, 2022. 2 pages. Published by Light GBM. https://lightgbm.readthedocs.io/en/latest/.

Golecha, Y., "Analyzing Term Deposits in Banking Sector by Performing Predictive Analysis Using Multiple Machine Learning Techniques." Published Nov. 12, 2017 by National College of Ireland. 22 pages. http://norma.ncirl.ie/3100/1/yogeshsanjaygolecha.pdf.

Grover, et al., "Node2Vec: Scalable Feature Learning for Networks." Published Aug. 2016 by ACM. 10 pages. In Proceedings of the 22Nd ACM SIGKDD International Conference on Knowledge Discovery and Data Mining, San Francisco, California, USA, pp. 855-864, doi: 10.1145/2939672.2939754.

Kawahara, et al., "Cash flow prediction of a bank deposit using scalable graph analysis and machine learning." Published in 2021 by IEEE. 10 pages.

Kreynen, et al., "Time series predictions for bank account balances." Published Jun. 24, 2016 by TU Delft. 78 pages. https://repository.tudelft.nl/islandora/object/uuid%3A9b1d0211-6180-418b-a341-a65c3f0d7e7b.

Malewicz, et al., "Pregel: A System for Large-Scale Graph Processing." Published Jun. 2010 by ACM. 11 pages. In Proceedings of the 2010 ACM SIGMOD International Conference on Management of Data, Indianapolis, Indiana, USA, pp. 135-146, doi: 10.1145/1807167.1807184.

Mtake, "fss-graph-command." Accessed Jul. 21, 2022. 4 pages. Published by Github. https://github.ibm.com/MTAKE/fss-graph-command.

Mtake, "fss-graph-document." Accessed Jul. 21, 2022. 2 pages. Published by Github. https://github.ibm.com/MTAKE/fss-graph-document/tree/master/documents.

Mtake, "fss-graph-runtime." Accessed Jul. 21, 2022. 10 pages. Published by Github. https://github.ibm.com/IBM-Research-AI/fss-graph-runtime.

Mtake, "fss-graph-service." Accessed Jul. 21, 2022. 7 pages. Published by Github. https://github.ibm.com/MTAKE/fss-graph-service.

Salas-Molina, et al., "Data-driven multiobjective decision-making in cash management." Published Jun. 2018 by Elsevier. 16 pages. In EURO Journal on Decision Processes, vol. 6, No. 1-2, pp. 77-91, doi: https://doi.org/10.1007/s40070-017-0075-y.

Salas-Molina, et al., "Empowering cash managers to achieve cost savings by improving predictive accuracy." Published May 16, 2016 by Elsevier. 23 pages. In International Journal of Forecasting, vol. 33, No. 2, pp. 403-415, https://doi.org/10.1016/j.ijforecast.2016.11.002.

Wei, et al., "Bitcoin Transaction Forecasting with Deep Network Representation Learning." Published Mar. 8, 2022 by ARXIV. 12 pages. https://arxiv.org/pdf/2007.07993.

Wu, et al., "Who Are the Phishers? Phishing Scam Detection on Ethereum via Network Embedding." Published Feb. 2022. 11 pages. In IEEE Transactions on Systems, Man, and Cybernetics: Systems, pp. 1-11, doi: 10.1109/TSMC.2020.3016821.

* cited by examiner

GRAPH FEATURE BASED SYSTEM FOR FLOW MANAGEMENT

STATEMENT REGARDING PRIOR DISCLOSURES BY THE INVENTOR OR A JOINT INVENTOR

The following disclosure(s) are submitted under 35 U.S.C. 102(b)(1)(A):

Ryo Kawahara and Mikio Takeuchi. Cash Flow Prediction of a Bank Deposit Using Scalable Graph Analysis and Machine Learning. In 2021 IEEE International Conference on Big Data (Big Data) 2021 Dec. 15 (pp. 1647-1656). IEEE.

BACKGROUND

The present invention relates generally to the electrical, electronic and computer arts and, more particularly, to machine learning systems.

Flow management, such as cash flow management, traffic flow management, and the like, is an important task for a variety of applications, from managing monetary flows to managing road traffic. Such flows may be modeled using graphs and analyzed using a graph analysis platform such as a graph database. In analyzing traffic flows (such as network traffic and road traffic), graphs are used to model the arrival and departure of packets, vehicles, and the like.

In banking, cash flows corresponding to bank transfers are used as the main mode of settlement of business trades among enterprises. To support the timely settlements of the trades, a bank must retain a sufficient amount of cash. This amount fluctuates every day depending on the bank's requests for transfers, withdrawals, or deposits from customers, as well as on the incoming transfers. However, keeping excessive amounts of cash will lead to a loss of opportunity for gaining a profit from investing the funds on hand. Since a failure of cash flow management in a bank has a large impact on the liquidity of a nationwide settlement network, the amount of cash that a bank must retain is usually regulated by authorities. Such regulations require each bank to keep the monthly average of its current amount of cash at a certain level. Generally, regulation is appropriate to maintain the liquidity of the nation-wide inter-bank settlement network, and also for the central bank to control the money supply. Thus, each bank needs to predict the total amount of deposits of customers to properly control its cash level and satisfy pertinent governmental regulations. There are, however, issues in the prediction of the aggregate amount of deposits: although there are known patterns in its dynamics, predicting how long a money flow stays within a bank is difficult.

BRIEF SUMMARY

Principles of the invention provide a graph feature-based system for flow management. In one aspect, an exemplary method includes the operations of obtaining input data; converting the input data into a graph; based on the converted input data, generating a time series of snapshot graphs by selecting edges whose timestamps are in a given time window for each of a plurality of time windows, each edge having a corresponding attribute; computing internal flow probabilities for each snapshot graph of the time series of snapshot graphs; and controlling a system based on the internal flow probabilities.

In one aspect, a non-transitory computer readable medium comprises computer executable instructions which when executed by a computer cause the computer to perform the method of obtaining input data; based on the converted input data, converting the input data into a graph; generating a time series of snapshot graphs by selecting edges whose timestamps are in a given time window for each of a plurality of time windows, each edge having a corresponding attribute; computing internal flow probabilities for each snapshot graph of the time series of snapshot graphs; and controlling a system based on the internal flow probabilities.

In one aspect, a shared-memory graph analysis platform based on a graph computer comprises a memory and at least one processor, coupled to the memory, and operative to perform operations comprising obtaining input data; based on the converted input data, converting the input data into a graph; generating a time series of snapshot graphs by selecting edges whose timestamps are in a given time window for each of a plurality of time windows, each edge having a corresponding attribute; computing internal flow probabilities for each snapshot graph of the time series of snapshot graphs; and controlling a system based on the internal flow probabilities.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improve the technological process of graph-based machine learning in cases where a graph is dynamic (that is, the graph structure and node attributes change over time) by use of snapshot graph sequences, an internal flow feature (where the flow dynamics is approximated as a random walk (or Markov process)), and/or integration with a time series;

a transaction graph that is dynamic (that is, the graph structure and node attributes change over time);

processes graph edges that have attributes (such as the amount of money transferred in a transaction);

handling of large and often scale-free graphs, which indicates the existence of super-hubs that connect a large number of nodes (making it difficult to decompose, filter, or sample the graph);

an extensible and scalable graph analysis platform that can extract domain-specific graph features; support for a graph computer which targets machine learning-related tasks, supports a graph programming model, and computes a graph feature with an algorithm that is described in the model;

support for the vertex-centric, bulk synchronous parallel programming paradigm, where memory footprints of the attributes and inter-vertex messages for graphs are optimized;

formulation of cash flow prediction as a time-series prediction task with a dynamic graph as an input;

improved flow analysis using a shared-memory graph analysis platform based on a graph computer;

maintenance of edge attributes and node attributes of a snapshot graph in memory for direct access;

compact representations of the edge attributes and the node attributes in memory;

improved cash flow prediction accuracy by applying graph analysis;

significant reduction in the error of a long-term cash flow prediction compared to that of a non-graph-based time-series prediction model;

improved ability to detect and mitigate hacking, detect and mitigate money laundering, control traffic flow, and the like; and reduced cost for a bank's cash operation and increased profit in terms of asset liability management (ALM) as a result of improving the accuracy of the cash flow prediction.

Some embodiments may not have these potential advantages and these potential advantages are not necessarily required of all embodiments. These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Introduction

Flow management, such as cash flow management, traffic flow management, and the like, is an important task for a variety of applications, from managing monetary flows to managing road traffic. For example, a bank's deposits continuously fluctuate as customers execute transactions and monetary funds flow between different accounts and different banks. Moreover, a bank needs to predict the total amount of deposits of customers to properly control its cash level and satisfy governmental regulations. Such regulations require each bank to keep the monthly average of its current amount of cash at a certain level, a regulation that is needed to maintain the liquidity of the nation-wide inter-bank settlement network and to control the money supply by the central bank. There are, however, issues in the prediction of the aggregate amount of deposits: although there are known patterns in its dynamics, predicting how long a money flow stays within a bank is difficult.

Figure 1:
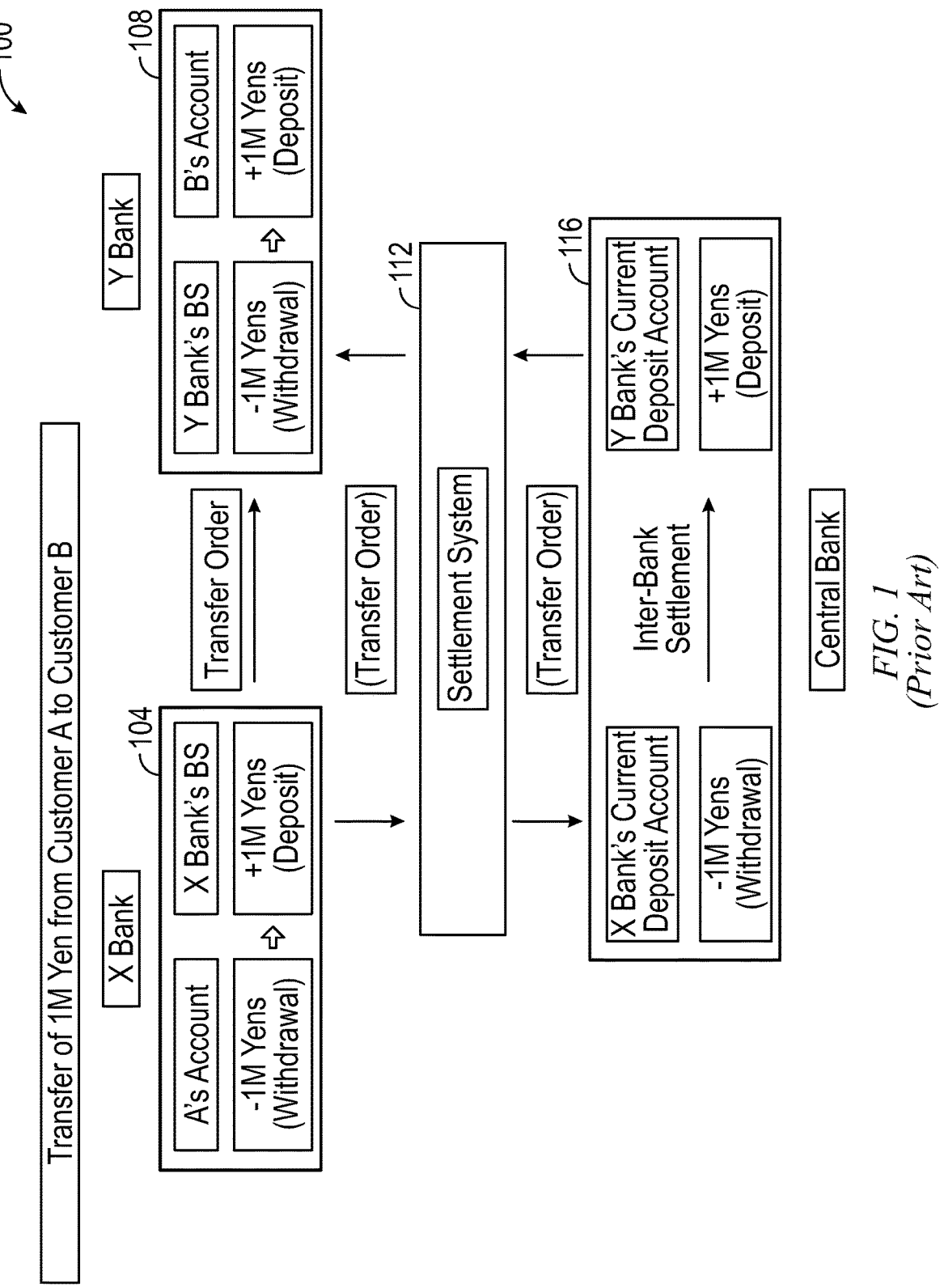
FIG. 1 illustrates a conventional two-tier, inter-bank settlement system.

FIG. 1 illustrates a conventional two-tier, inter-bank settlement system 100. A transfer order from A's account at bank 104 to B's account at bank 108 is depicted. The actual transfer of funds is performed by the inter-bank settlement system 112 of the central bank 116.

Figure 2:
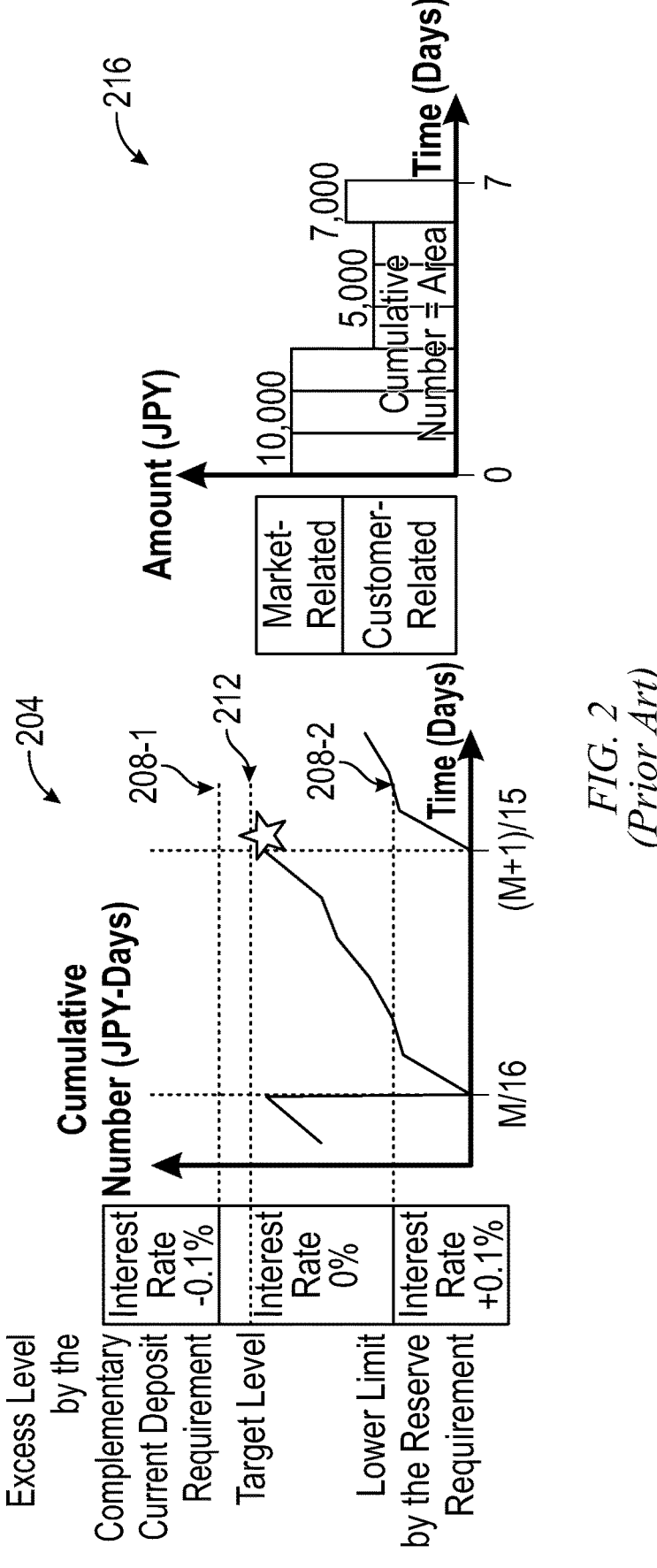
FIG. 2 illustrates an example conventional graph of a bank's current deposit in the central bank and an example reserve requirement and target level.

FIG. 2 illustrates an example conventional graph 204 of a bank's current deposit in the central bank 116, and an example reserve requirement 208-1, 208-2 (upper and lower limits) and target level 212. A bank 104, 108 must maintain its amount of deposit in the central bank 116 between the upper limit 208-1 and lower limit 208-2 in terms of its average for a month to maintain the liquidity of the settlement system 112. If a bank 104, 108 violates the upper limit 208-1 of deposits, the bank 104, 108 will be subject, for example, to a reduced interest rate (e.g., –0.1%). (The interest rate of the current deposit in the central bank is determined monthly by the average amount of deposit (the cumulative number) during the evaluation period, as illustrated by chart 216. The evaluation period is, for example, from the $15^{th}$ of a month to the $16^{th}$ of the next month. It is noted that, depending on economic conditions, the upper limit 208-1 or the lower limit 208-2 may be of less importance. For example, during quantitative easing, the upper limit 208-1 may be of less importance.)

Figure 3:
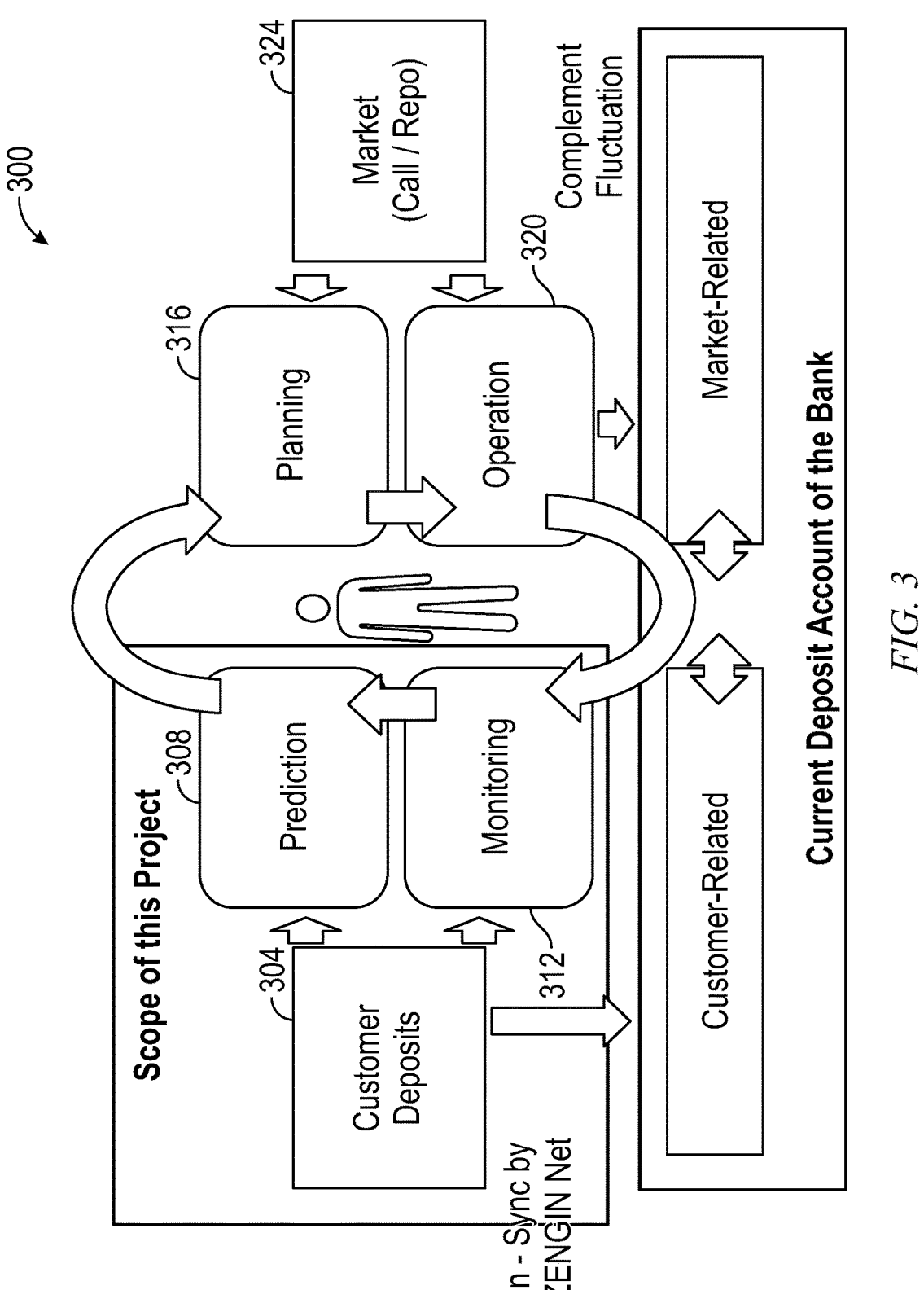
FIG. 3 illustrates a conventional reserve requirement process.

FIG. 3 illustrates a conventional reserve requirement process 300. A monitoring process 312 monitors, for example, the transactions of customers of the bank 104 and cash on hand. A prediction process 308 predicts a future amount of cash on hand. If a bank 104 has too much cash on hand, it may, for example, purchase bonds via market 324 to lower the amount of cash on hand. Similarly, if a bank 104 has too little cash on hand, it may, for example, sell bonds via the market 324 to increase the amount of cash on hand. This is part of the planning process 316 and the operations process 320. (It is noted that uncontrollable aspects of the money flow include that money for the settlement of customers' money transfer requests fluctuates every day and a precise prediction of the cash demand is important to make the operation efficient. It is also noted that controllable aspects include money for market trades by a bank: excess money can be lent or consumed by government bond purchase, and vice versa. Profitability and the cost of the operation depend on the market conditions.)

When machine learning (ML) is used for the prediction of cash on hand, graph feature vectors can be used to improve its accuracy. In general, bank transfer transactions can be formalized as a graph (Vertex=account, Edge=transfer). Though the transaction graph is a source of rich information, a ML model cannot handle a graph directly because of its non-regular and sparse structure. A conversion to a vector that represents a state of the graph is needed. There are, however, issues in the graph feature extraction:

1) many existing methods ignore domain-specific edge attributes (especially money; most of them focus on the topology only); and 2) scalability is important, as the transaction graph in a bank 104, 108 is huge (typically on the order of one million nodes and ten million edges).

Pertinent Ideas

Figure 4:
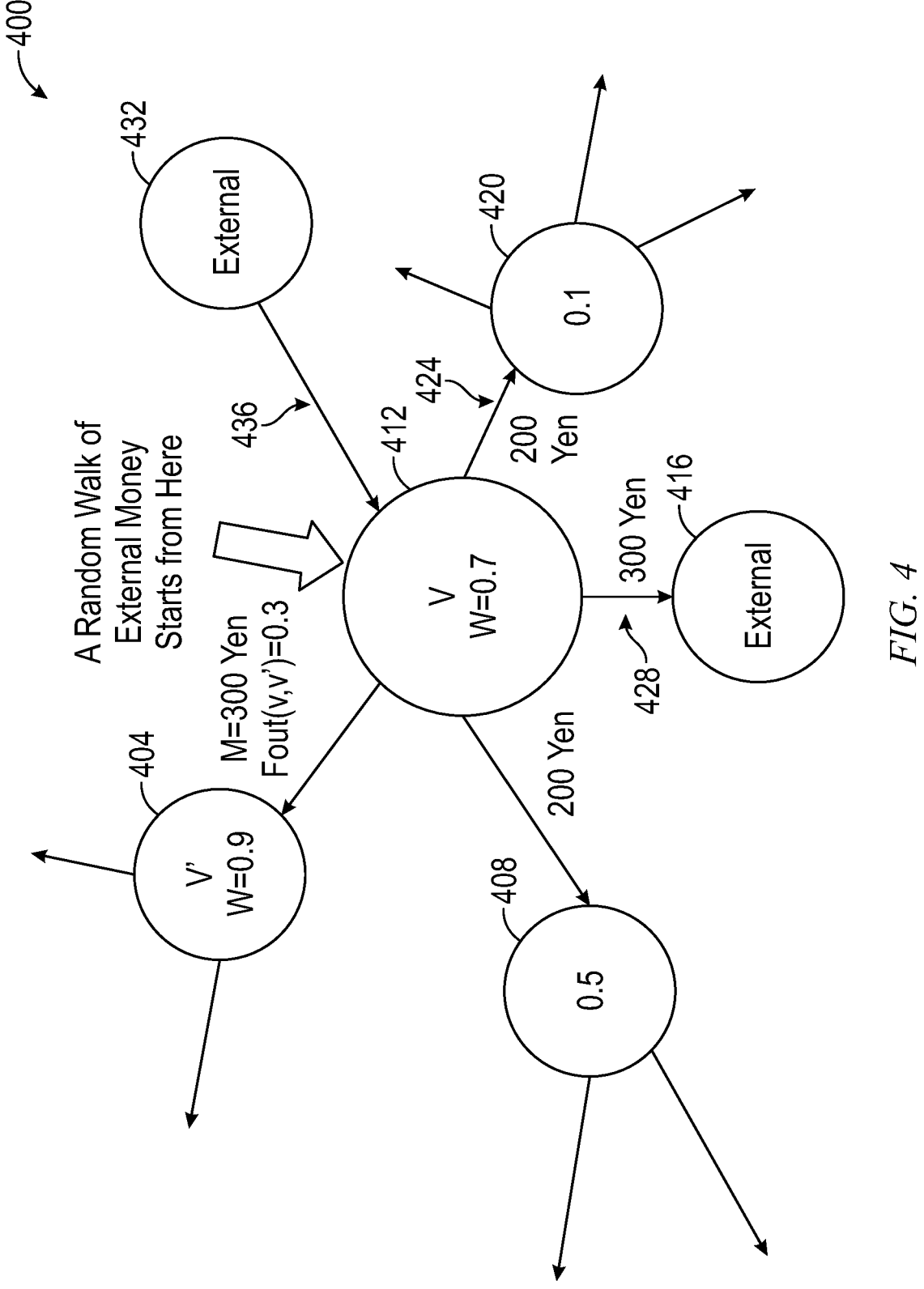
FIG. 4 illustrates a transaction sub-graph created from transaction data, in accordance with an example embodiment.

FIG. 4 illustrates a transaction sub-graph 400 created from transaction data, in accordance with an example embodiment. Each node 404, 408, 412, 416, 420 represents an account (such as an account A={v|v=(id, is_internal)} where id is the account identifier) and edges, such as edges 424, 428, represent transfers. Node 416 represents an account at an external bank 108; the remaining nodes 404, 408, 412, 420 represent accounts at the given bank 104. When money transfers between accounts of the given bank 104, the cash on hand of a given bank 104 does not change; alternatively, when money transfers between accounts of the given bank 104 and another bank 108, the cash on hand of the given bank 104 changes. If money is flowing into an account that typically conducts transactions primarily with external banks 108, then this money will tend to diminish the cash on hand of the given bank 104; alternatively, if money is flowing into an account that typically conducts transactions primarily with accounts of the given bank 104 (as represented by edge 436 from node 432), then this money will tend to increase the cash on hand of the given bank 104. Since node 412 has a weight w of 0.7, there is a 70% chance of a transfer being internal and a 30% chance of a transfer being external.

In general, cash flow prediction for a bank 104 is an important task as it is not only related to liquidity risk but is also regulated by financial authorities. As noted above, to improve the prediction, a graph analysis of bank transaction data is advantageous, while its size, scale-free nature, and various attributes make the task challenging.

In one example embodiment, a graph-based machine learning method for a cash flow prediction task is disclosed. An extensible and scalable shared-memory parallel graph analysis platform is introduced that supports the vertex-centric, bulk synchronous parallel programming paradigm. One novel graph feature introduced upon the platform is an internal money flow feature based on the Markov process approximation.

In the context of conventional liquidity risk management, the amount of cash of a bank 104, 108 is regarded as a static parameter of a stochastic risk model. However, a dynamical approach, such as the prediction of the cash flow, has more value since it can enable further optimization of cash flow management by reducing the cost of cash preparation and increasing the profit of the investment.

Generally, each bank 104, 108 has a large amount of transaction data. This data can be used for various financial analysis tasks including anti-money laundering (AML), financial fraud detection, credit risk analysis, and cash flow prediction. One important characteristic of the data is that it can be modeled as a graph, such as the graph 400. A graph 400 can express the structure of the trades, such as counter parties and supply chains, which are often overlooked in the usual time-series analysis. Graph-based machine learning is a promising approach and has already been successfully applied in various areas. However, the financial transaction graph 400 of a bank 104, 108 may have the following characteristics that are not well addressed in the existing methods:

a transaction graph 400 is dynamic (that is, the graph structure and node attributes change over time);

edges 424, 428 have attributes (in particular, the amount of money transferred in that transaction is an attribute of the edge 424, 428 that plays a pertinent role); and the graph 400 is large and often scale-free, which indicates the existence of super-hubs that connect a large number of nodes 404, 408, 412, 416, 420 (which makes it difficult to decompose, filter, or sample the graph 400).

Because of the aforementioned characteristics of the transaction graph 400, we have found that it is appropriate to use an extensible and scalable graph analysis platform that can extract domain-specific graph features.

From the machine-learning perspective in general, the graph feature computation is an embarrassingly parallel problem in which a task (i.e., the computation of a graph feature) of a node 404, 408, 412, 416, 420 (or an edge 424, 428) is independent of the tasks of other nodes 404, 408, 412, 416, 420 (or edges 424, 428), while the graph feature computation does not update the graph data itself. As used herein, "embarrassingly parallel" is used in its ordinary sense as will be understood by a skilled artisan; i.e., an embarrassingly parallel workload or problem is one where little or no effort is needed to separate the problem into a number of parallel tasks.

The existing graph analysis platforms are classified into two types. The first type is the graph database. It supports a graph query language and returns a set of sub-graphs that satisfies the condition (i.e., pattern) described in the language. It is suitable for interactive analysis; however, it is impractical to use a graph database for a machine-learning task(s) because (i) in the graph query language, the parallelism is implicit and its scope is limited, and (ii) the graph database has the overhead of supporting persistence and transactions, which are unnecessary in this context.

The second type of platform is the graph computer, which targets machine learning-related tasks. It supports a graph programming model and computes a graph feature with an algorithm that is described in the model. The model does not update the graph 400 and thus the graph computer does not support persistence or transactions. In addition, the model supports the embarrassing parallelism, which can accelerate graph feature computation from large-scale graphs 400.

From these characteristics, a graph computer is used for an exemplary machine learning task in one or more exemplary embodiments. An exemplary embodiment of an extensible and scalable shared-memory graph analysis platform is disclosed that supports the vertex-centric, bulk synchronous parallel programming paradigm, where the memory footprints of the attributes and inter-vertex messages for financial graphs 400 are optimized. In one example embodiment, an internal cash flow feature based on Markov process approximation is disclosed.

Formulation of an Exemplary Problem

In one example embodiment, cash flow prediction is formulated as a time-series prediction task with a dynamic graph 400 as an input.

The amount of cash in a bank 104, 108 is affected by multiple factors. Among those, increases or decreases in the amount of deposits of customers have uncertainties and thus prediction is appropriate. Let B(t) be the total amount of deposits in a bank 104, 108 at time step t∈ N. This value is not predicted directly because its distribution is not stationary. Moreover, the data set includes transactions and does not contain the amounts of deposits of the accounts. Therefore, the target variable of the prediction is the change in the total amount of deposits in a bank 104, 108 in T time steps from the current step. That is, $$\Delta_T(t+T) = B(t+T) - B(t) \tag{1}$$

In one or more embodiments, the size of the time step/and the length of prediction T∈ N are assumed to be one day and approximately one month, respectively. This is because the regulator evaluates the amount of cash of a bank 104, 108 by its monthly average. A shorter prediction length is also useful for optimizing the cash flow management operations, and other prediction timeframes are contemplated.

$\Delta_T(t+T)$ is predicted from past transaction records and a number of exogenous variables.

$$\Delta_T(t+T) = f_T(t, \{x(t') \,|\, t' \le t\}, \{x_C(t') \,|\, t' \in N\}) \tag{2}$$

where $f_T$ is a prediction model to be learned from the data and the total amount of deposits is $\{f(t)|t<=tc\}$, x(t) is a feature vector that is derived from the data, and $x_C(t')$ is a feature vector that does not depend on the past data (e.g., whether t' is a Sunday or not).

In one or more embodiments, the feature vector can be decomposed as $x=(x_G\|x_N)$, where $x_G(t)$ is the graph feature vector, $x_N(t)$ is the non-graph feature vector, and (•||•) is the vector concatenation.

One pertinent aspect is to define a function $F_G$ that computes the feature $x_G(t)$ from the dynamic graph $\Gamma(t)$. Here, $\Gamma(t)$ is defined as a sequence of graphs 400:

$$\Gamma(t) = \{G(t') \,|\, 0 \le t' \le t\} \tag{3}$$

and G(t)=(V(t), E(t)) is a snapshot graph 400 at time step t, and V(t) and E(t) are the set of vertices 404, 408, 412, 416, 420 and edges 424, 428 at time step t, respectively. Here, a vertex v∈ V(t) corresponds to an account, and an edge e∈ E(t) corresponds to a transfer transaction. Vertices 404, 408, 412, 416, 420 and edges 424, 428 can have attributes, which are denoted as v.attr and e.attr, respectively, where attr is an attribute name. In particular, an edge e has at least two important attributes: the time stamp and transfer amount. A time window operation is used for each time step to select transfers that are modeled as edges 424, 428 in E(t). The construction process of the snapshot graph 400 is described in the section entitled Experiment: Pre-processing.

A simplification on the function $F_G$ is made so that only one snapshot graph 400 is processed at a time and converted into a low-dimensional vector to reduce the memory footprint.

$$x_G(t) = F_G(\{H_G(G(t')) \,|\, t' \le t\}), \tag{4}$$

where $H_G$: $\Gamma \rightarrow \mathbb{R} \rightarrow^d$, d∈ N is a graph processing function that is implemented on a scalable graph analysis platform.

Scalable Graph Analysis Platform

Figure 7:
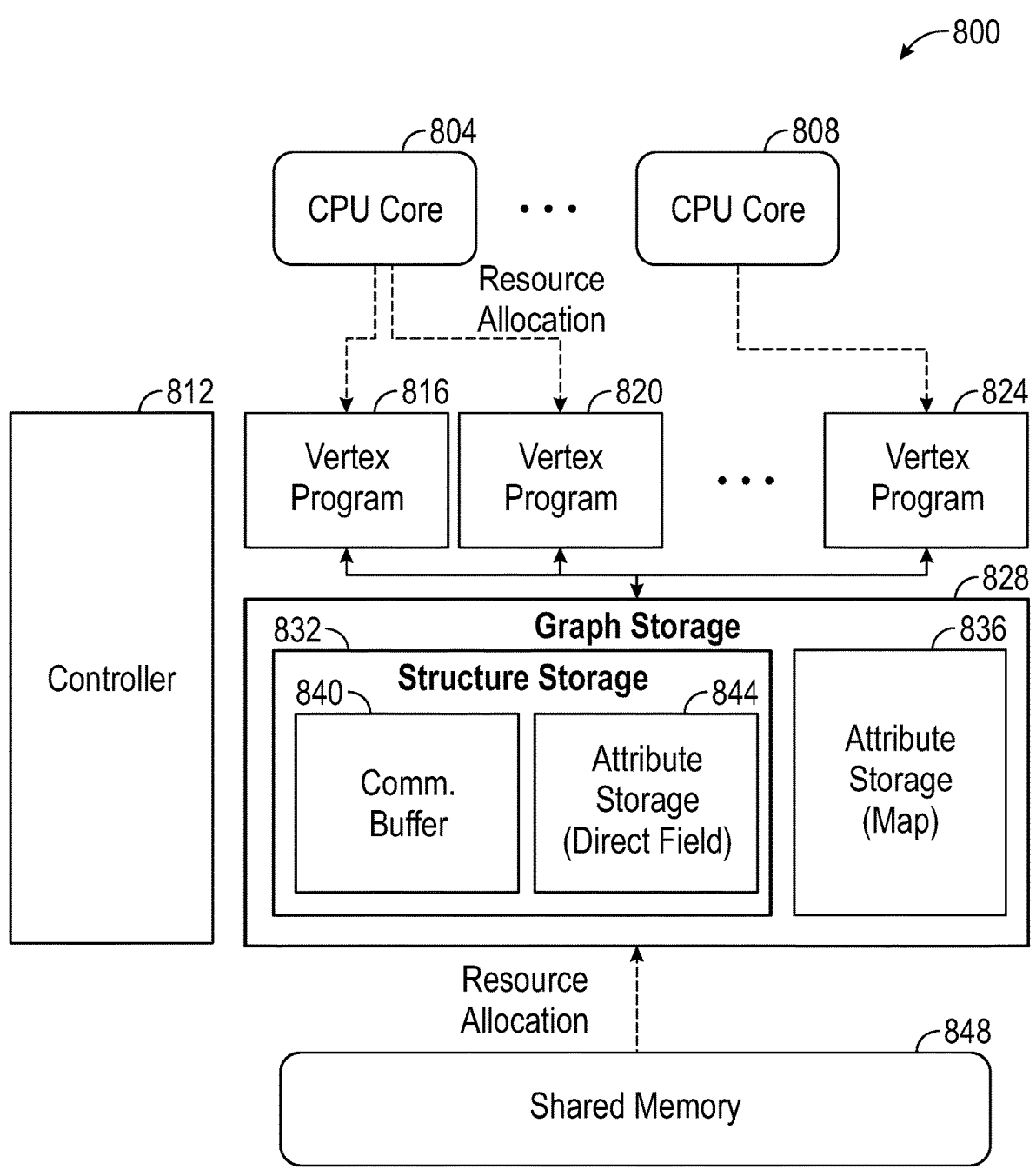
FIG. 7 is a block diagram of a shared-memory graph computer that supports the vertex-centric bulk synchronous parallel (BSP) programming model, in accordance with an example embodiment.

FIG. 7 is a block diagram of a shared-memory graph computer 800 that supports the vertex-centric BSP programming model, in accordance with an example embodiment. The graph computer 800 includes a plurality of central processing unit (CPU) cores 804, . . . , 808 that execute, under the control of controller 812, a set of algorithms, such vertex programs 816, 820, . . . , 824, that includes standard ones as well as specialized ones for financial domains. Graph storage 828 stores the snapshot graph 400, including the storage of the edge attributes and the node attributes in attribute storages 836 and 844. In particular, graph storage 828 includes structure storage 832 and attribute storage (map) 836. Structure storage 832 includes communications buffer 840 and attribute storage (field) 844 for direct field access. Note also the shared memory 848 implemented as software modules combined with computer memories.

In one example embodiment, the controller 812 and the vertex programs 816, 820, . . . , 824 are implemented as software modules. In particular, the vertex programs 816, 820, . . . , 824 are software modules that are executed as multiple threads to enable the parallel processing. The graph storage 828 and sub-modules 832, 836, 840, 844 are implemented as software modules combined with computer memories to store the graph data. The structure storage 832 stores nodes 404 and edges 424, 428 of the snapshot graph 400. Attributes of the nodes 404 and edges 424, 428 are stored in attribute storages 836, 840. The communication buffer 840 is used by the vertex programs 816, 820, . . . , 824 for storing intermediate data and the graph features as well as for sharing those values with other vertex programs for communication. Given the teachings herein, the skilled artisan can implement the software modules by programming the logic described herein, using a suitable high-level programming language compiled or interpreted into machine-executable code.

In one example embodiment, an exemplary scalable graph analysis platform, which includes the graph computer and the corresponding algorithms, is written in Java and works as a Java library. The platform also has a command-line interface as well as a representational state transfer (REST) application programming interface (API) that is suitable for a microservice usage and implementation in a cloud environment. In one example embodiment, the platform is a vertex-centric, shared-memory, parallel Java graph library for fast feature generation at high scale (such as, 24 minutes for a |V|=100M, |E|=1B random graph on a conventional central processing unit in a cloud environment).

High performance and scalability are pertinent aspects of a graph computer to enable graph feature computation from large-scale graphs. A pertinent aspect for high performance is fast access to the node- and edge-attributes by keeping them in memory and referencing them directly. (This refers to, for example, attribute storages 836, 844. In particular, frequently accessed attributes are stored in attribute storage 844, which is tightly coupled with structure storage 832 to provide the fast access.)

The limitation in the in-memory graph analysis of real-world data due to the memory size has been mitigated by advanced semiconductor technology. Combined with the shared-memory nature, one or more exemplary embodiments of the graph computer have no serialization or communication overhead (see communication buffer 840), which can lead to better performance compared to other cluster-based graph computers such as are employed in known graph and graph-parallel computation techniques. A pertinent aspect for high scalability is a small footprint which is contradictory to keeping the attributes in memory. In one or more embodiments, this problem is addressed by using compact representations, such as primitives rather than objects, as fields rather than a map (see, attribute storage (direct field) 844), and as type-specific collections (arrays, lists, sets, maps, and the like) (see, attribute storage (map) 836) rather than generic Java collections (a library of the above data structures provided as a default for Java programs).

New Graph Features Based on Internal Flow

In addition to the existing general-purpose graph features, domain-specific graph features can be utilized, which explicitly exploit edge and vertex attributes.

One graph feature is named internal flow probability. The context behind this feature is explained as follows. A bank's transaction data may contain (a) transfers between accounts in the bank 104, 108 (i.e., internal transfers) as well as (b) transfers from or to accounts in other banks 104, 108 using inter-bank settlement networks (i.e., external transfers). Among these transfers, only the external transfers change the total amount of deposits in a bank 104, 108.

When an internal account receives money from an external account, it is expected that the money will soon be used for fulfilling their business needs within a typical business cycle (e.g., a company sells their products to receive money from its customers, which requires payments to its suppliers in the monthly cycle). If the account tends to (A) trade with internal accounts, then the money continues to be in the bank 104, 108, while if the account tends to (B) trade with external accounts, the money will be sent to other banks 104, 108 and the total amount of deposits in the bank 104, 108 returns to its previous level. Scenario (A) is more important in one or more instances because it has a larger impact on the monthly average of the total amount of deposits in the bank 104, 108.

The difference between Scenarios (A) and (B) are approximately estimated by estimating the ratio of transfer to internal and external accounts from the snapshot graph 400 whose window size is a typical business cycle (e.g., one month).

Here, the internal flow probability feature is defined. Let $M(v, v')$ be the amount of money transferred from $v$ to $v'$ within a time window, and $M_{in}(v)$ and $M_{out}(v)$ be the amount of money transferred to and from $v$, respectively. (For example, 300 yen are shown flowing from node 412 to node 404 in FIG. 4.) The ratios of incoming (from $v'$ to $v$) and outgoing (from $v$ to $v'$) money flow within a time window are defined as follows:

$$f_{in}(v, v') = M(v', v)/M_{in}(v) \qquad (5)$$

$$f_{out}(v, v') = M(v, v')/M_{out}(v) \qquad (6)$$

(Other flows and functions include:

$$M_{in}^{ext}(v) = (1 - w_{in}(v))M_{in}(v);$$

$$M_{out}^{ext}(v) = (1 - w_{out}(v))M_{out}(v);$$

$$f_{in}(v', v) = M(v', v)/M_{in}(v);$$

10

-continued $$w_{in}(v) = \sum_{v'}^{V(v)} f_{in}(v', v) \text{ (internal } tx \text{ ratio);}$$

$$s_{in}^{n}(v)$$

(the probability of in-flow previously being internal for n-hops after its entrance); and $$s_{in}^{n+}(v):$$

the probability of in-flow previously being internal for more than n-hops.)

The ratios of incoming and outgoing internal money flow of $v$ within a time window are $$w_D(v) = \sum_{v'}^{V(v)} f_{in}(v, v')$$

where $D \in \{in, out\}$ is a label that indicates the direction, and $V(v)$ is the set of internal neighbor vertices. FIG. 4 shows an example of those quantities.

To roughly estimate how long money at vertex $v$ can stay in the bank 104, 108, a random walk on the vertices of the snapshot graph 400 is considered, where the aforementioned ratio $f_D(v, v')$ is regarded as the transition probability of the random walk. Let $n \in N$ be the number of hops (steps) of a random walk on a graph 400. For D=out, the internal flow probability is defined as the probability of money performing a random walk from $v$ in $n$ hops only on the internal vertices 404, 408, 412, 420 in the graph 400 before it exits to an external vertex 416. Inversely, for D=in, it is defined as the probability of money having performed a random walk to $v$ in $n$ hops only on the internal vertices 404, 408, 412, 420 after its entry from an external vertex 416.

$$s_D^0(v) = 1 - W_D \qquad (8)$$

$$s_D^n(v) = \sum_{v'}^{V(v)} f_D(v, v')s_D^{n-1}(v') \qquad (9)$$

Similarly, the probability of money at $v$ can be expressed doing a random walk for more than $n$ hops as follows.

$$s_D^{1+}(v) = w_D(v) \qquad (10)$$

$$s_D^{n+}(v) = \sum_{v'}^{V(v)} f_D(v, v')s_D^{(n-1)}(v') \qquad (11)$$

(It is noted that $$s_{in}^{n}(v)$$

is the probability of the in-flow previously being internal for n-hops after its entrance;

$$s_{in}^{n+}(v)$$

is the probability of the in-flow previously being internal for more than n-hops;

$$s_{out}^{n}(v)$$

is the probability of the out-flow being internal for n-hops before its exit (modeled as a random walk); and $$s_{out}^{n+}(v)$$

is the probability of the out-flow being internal for more than n-hops where:

$$s_{out}^{0}(v) = (1 - w_{out}(v)) \text{ (for one node)};$$

$$s_{out}^{n}(v) = \sum_{v'}^{V(v)} f_{out}(v, v') s_{out}^{n-1}(v') \text{ (aggregate for all nodes)};$$

$$s_{in}^{0}(v) = (1 - w_{in}(v)) \text{ (for one node)};$$

$$s_{in}^{n}(v) = \sum_{v'}^{V(v)} f_{in}(v', v) s_{in}^{n-1}(v') \text{ (aggregate for all nodes).}$$

Note that there is a normalization condition for any n.

$$s_{D}^{0}(v) + s_{D}^{1}(v) + \ldots + s_{D}^{n-1}(v) + s_{D}^{n+}(v) = 1 \qquad (12)$$

Here, any temporal and inter-vertex correlations of edges 424, 428 within a time window are ignored. Therefore, the actual sequence of transfers can be different from that of the random walk in general. Rather than considering the detailed and accurate money flow, the extent of the internal transaction network where money flow can reside is roughly estimated from a snapshot graph 400.

Once the internal flow probability is defined for each vertex 404, 408, 412, 420, the values to be used for predicting the total amount of deposit in a bank 104, 108 are aggregated. Let L be a subset of internal vertices 404, 408, 412, 420 in the graph 400, such as large enterprises. The aggregated internal flow probability is computed as:

$$s^{n} = \sum_{v}^{L} (s_{in}^{n}(v) M_{in}^{ext}(v) - s_{out}^{n}(v) M_{out}^{ext}(v)) \qquad (13)$$

where $$M_{in}^{ext} \text{ and } (v) M_{out}^{ext}(v)$$

are the amount of incoming and outgoing external money flows on vertex v, respectively. The complexity of this algorithm is O(n|E|+n|V|).

Figure 5:
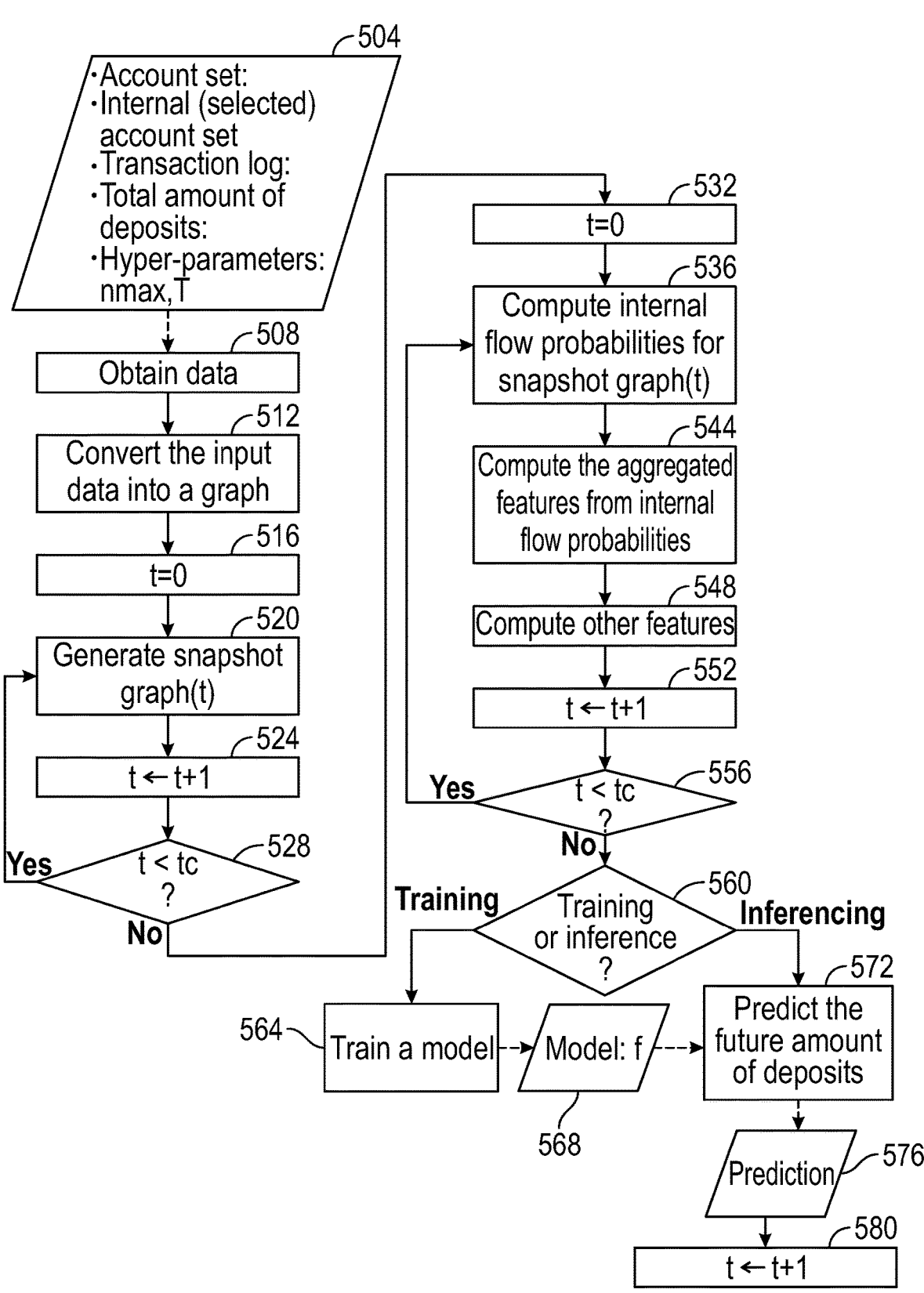
FIG. 5 is a flowchart for an example method generating a prediction of a future total amount of deposits, in accordance with an example embodiment.

FIG. 5 is a flowchart for an example method 500 generating a prediction of a future total amount of deposits, in accordance with an example embodiment. In one example embodiment, input data 504 is obtained (operation 508) and converted into a graph 400 (operation 512). A time step is initialized to t=0 (operation 516) and a snapshot graph 400 (graph(t)) is generated (operation 520) by selecting edges 424, 428 whose timestamps are in time window [t−T+1, t]. Time step t is incremented (operation 524) and a check is performed to determine if t<tc (operation 528). If t<tc (YES branch of operation 528), the method 500 proceeds with operation 520; otherwise (NO branch of operation 528), the time step is set to t=0 (operation 532).

Internal flow probabilities for snapshot graph(t) are computed (operation 536; described more fully below in conjunction with FIG. 6), the aggregated features from internal flow probabilities are computed (operation 544), and other features (e.g., various conventional graph features that can be used jointly with the internal flow features, such as degree, a measure that counts the number and quality of links to a web page, a measure for the collection and analysis of egocentric social network data, and the like) are computed (operation 548). Time step t is incremented (operation 552) and a check is performed to determine if t<tc (operation 556). If t<tc (YES branch of operation 556), the method 500 proceeds with operation 536; otherwise (NO branch of operation 528), a check is performed to determine if method 500 is performing a training or inferencing operation (operation 560). If the method 500 is performing inferencing (inferencing branch of operation 560), the method 500 proceeds with operation 572; otherwise (training branch of operation 560), a model is trained (train({(features(t), f(t)) |t<=tc})) to generate model 568 (operation 564) and the method 500 proceeds with operation 572. During operation 572, the future effect of the internal flows, such as the future total amount of deposits, is predicted to generate prediction 576 (f(tc+1)=model({features(t)|t<=tc})). Typically, the time step t is set to one day, and the generated prediction 576 considers 31 days of transaction data. In one example embodiment, the prediction 576 is used to control a system, such as detecting and mitigating an identified situation (operation 580). In one example embodiment, the prediction 576 is used to detect unusual flows of funds that can be indicative of financial hacking and be used to trigger a blocking of the corresponding malicious network traffic; for example, by adjusting the configuration of a network firewall or the like. In another example, unusual flows of funds that can be indicative of money laundering may be detected and may trigger an alert to the proper authorities. In one example embodiment, the method 500 is configured to monitor road traffic and the prediction 576 is used to detect traffic jams and trigger a rerouting of traffic; for example, by controlling traffic signals via an interface to a wide-area network 102 (see FIG. 8 and accompanying text; the firewall configuration could also be controlled via the interface to the wide-area network 102, or other wired or wireless connection).

Figure 6:
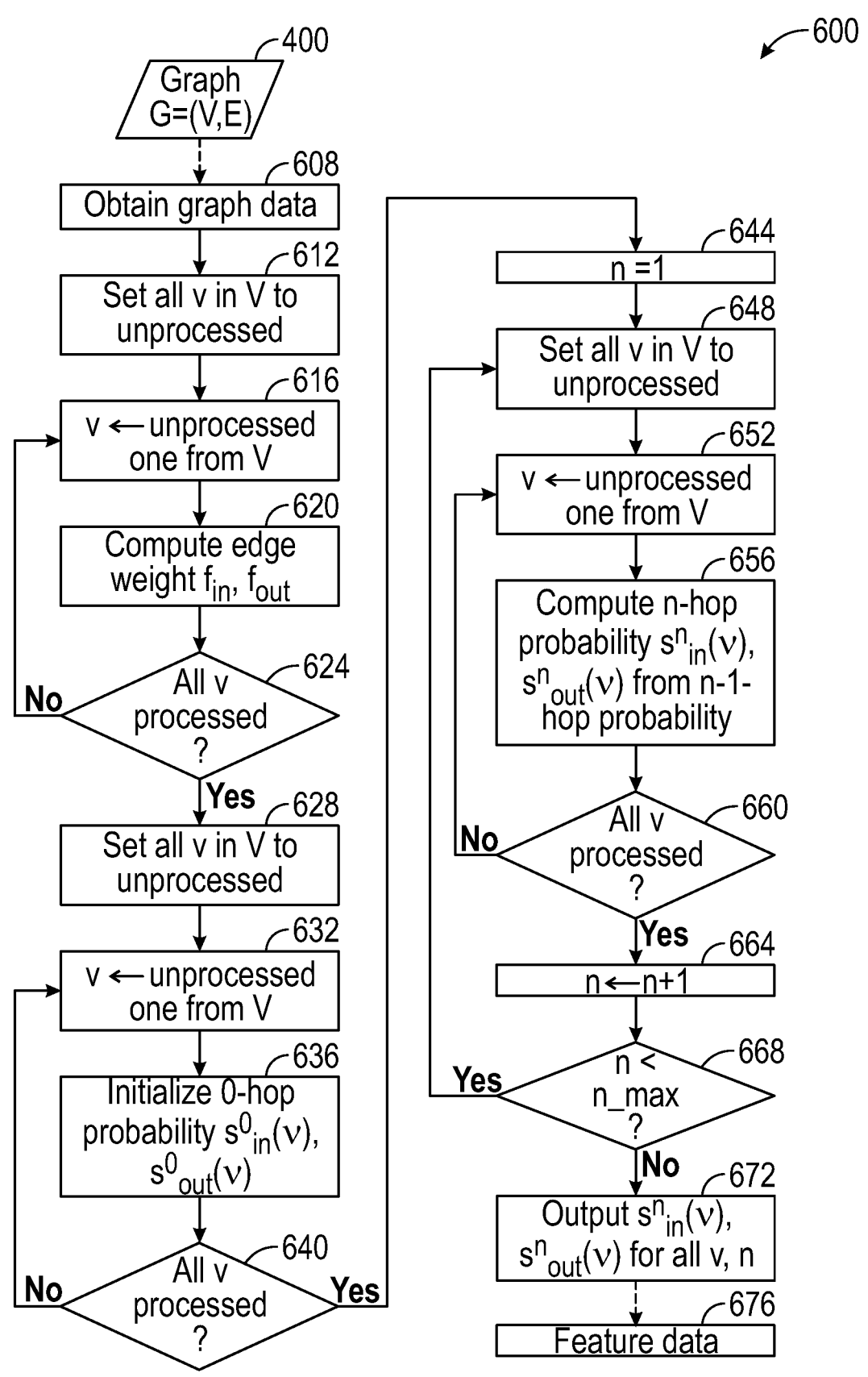
FIG. 6 is a flowchart for an example method for generating feature data, in accordance with an example embodiment.

FIG. 6 is a flowchart for an example method 600 for generating feature data 676, in accordance with an example embodiment. In one example embodiment, graph data of a graph 400 is obtained (operation 608) and all vertices v in V are assigned an unprocessed designation (operation 612). An unprocessed vertex v from V is retrieved (operation 616) and the edge weight, $f_{in}$, and $f_{out}$ are computed (operation 620). A check is performed to determine if all vertices v in V have been processed (operation 624). If all vertices v in V have not been processed (NO branch of operation 624), the method 600 proceeds with operation 616; otherwise (YES branch of operation 624), all vertices v in V are assigned an unprocessed designation (operation 628).

An unprocessed vertex v from V is retrieved (operation 632) and the 0-hop probabilities $$s_{in}^{0}(v), s_{out}^{0}(v)$$

are initialized (operation 636). A check is performed to determine if all vertices v in V have been processed (operation 640). If all vertices v in V have not been processed (NO branch of operation 640), the method 600 proceeds with operation 632; otherwise (YES branch of operation 640), hop count n is initialized to one (operation 644) and all vertices v in V are assigned an unprocessed designation (operation 648).

An unprocessed vertex v from V is retrieved (operation 652) and the n-hop probabilities $$s_{in}^{n}(v), s_{out}^{n}(v)$$

are computed (operation 656). A check is performed to determine if all vertices v in V have been processed (operation 660). If all vertices v of V have not been processed (NO branch of operation 660), the method 600 proceeds with operation 652; otherwise (YES branch of operation 660), the hop count n is incremented (operation 664). A check is performed to determine if $n < n\_max$ (operation 668). If $n < n\_max$ (YES branch of operation 668), the method 600 proceeds with operation 648; otherwise (NO branch of operation 668), the n-hop probabilities $$s_{in}^{n}(v), s_{out}^{n}(v)$$

are output to generate feature data 676 (operation 672).

Comments on Data

Embodiments of the invention can be used on many different kinds of data; for example, a set of bank transactions such as from a large bank 104, 108. The transaction data can be used, for example, to construct a time series of the total amount of deposits as well as to construct the graphs 400. This example of data is intended to be exemplary and non-limiting. One or more embodiments are usable even on scale-free data and/or data that exhibits super-hubs.

Experiment: Pre-Processing

In one example embodiment, the transfer log (where {tx|x=(txid, v, v', amount, timestamp)}) is pre-processed into a sequence of graphs 400 as follows:

extract the accounts that appear in the transactions and convert the extracted accounts into vertices 404, 408, 412, 416, 420;

convert the transfers into a list of edges 424, 428; and generate snapshots for the edge list using a daily sliding window of length W, i.e., transfers that occurred in [t−W+1, t] are selected as a snapshot of the t-th day.

The daily snapshots are then processed as graphs 400 by the scalable graph analysis platform to extract graph feature vectors. The vectors include a daily time series that describes the dynamics of the graph sequence in a fixed dimension.

Graph Feature Generation

In one experimental setup, a bare-metal machine with 80 cores of a cloud server-level CPU and 800 GB memory was used, with a conventional multi-tasking operating system. Exemplary data included snapshot data on the order of one month with over four million nodes and over 60 million edges, and data on the order of one year with over 10 million nodes and over 590 million edges.

Experiments: Prediction Accuracy

1) Selection of large business accounts: as part of a non-limiting exemplary experiment, for the aggregation of the vertex-level features (see section entitled New graph features based on internal flow), a subset of accounts L was selected from the whole set of accounts. The focus was mainly on large enterprises. This is because the distribution of the amount of money transfers has a power-law tail, which indicates that the top accounts dominate the change of the total amount of deposit.

Such accounts can be found, for example, by listing the top 100 accounts in the monthly amount of transfer for each month and taking the union of them. In the non-limiting exemplary experiment, 100+ accounts were identified in this way and were defined as the elements of the large account set L.

2) Prediction model: an implementation of the gradient boosting method for the time series prediction was used. Since the model is decision tree-based, it can handle a non-linear relationship between the input and output.

Among the various input variables, a number of those are based on the current and past transaction data. The features include the prediction target variables and graph features (the internal flow probability). To incorporate the capability of autoregressive integrated moving average (ARIMA)-like models, the features were further processed as follows:

raw past value of time step t−p where p=1, 2, 3, . . . ;

moving average of length r; and difference between the current and a past value at t−p. Here, the features generated by the aforementioned process are called derived features.

Calendar features were also used to incorporate the seasonality. Binary-encoded national and bank holidays, weekends, "five-ten days," and adjusted five-ten days were used, as well as day of week (0-6), business day (1-27), and day of month (1-31). The five-ten day was defined on the basis of the domain knowledge. That is, the value is 1 if the day of the month is 5, 10, 15, 20, 25, or the end of a month; otherwise, the value is 0. The adjusted five-ten day is equivalent to five-ten days except for weekends and holidays, where five-ten days are moved to the latest weekdays.

The non-graph feature set was defined as a set of $\Delta_T(t)$ and its derived features and calendar features. Here, T corresponds to the length of the prediction. The non-graph feature set works as the baseline model of this experiment.

The feature selection was further optimized using a greedy removal of unnecessary features from each feature set.

3) Metrics of evaluation: for the evaluation of the prediction accuracy, a relative mean absolute error (MAE) was chosen as a metric, instead of the usual root mean square error (RMSE). The relative MAE does not depend on the unit (i.e., currency) of the predicted value. This choice is similar to that of previous studies of ATM cash flow prediction, where symmetric mean absolute percentage error (SMAPE) is used. The reason for the choice is that the minimization of RMSE indicates that the predicted value is the average of the samples, while the average tends to diverge when the samples are derived from a power-law distribution $p(x) \sim x^{-a}$ with an exponent $a \leq 2$, due to the existence of the large outliers.

To compare the accuracy with that of different time series, the MAE was normalized with that of a baseline MAE, which is called the relative MAE here. A baseline was chosen to be a simple method that uses the mean of the values of the past 50 days as a predicted future value. The idea is somewhat similar to the coefficient of determination ($R^2$). The results of Saturdays, Sundays, and holidays were eliminated since a very small amount is transacted on those days.

4) Training, validation, and testing: the data was split into training, validation, and testing data sets. The training (V) and validation data sets were used for the hyper-parameter optimization and the feature selection (see, e.g., discussion of prediction model elsewhere herein). The training (T) and testing data sets were used for the evaluation of the accuracy. A 31-day buffer was put between the training (T) and testing periods to avoid using future values in the training.

At the beginning of the training time series, the first T steps cannot be used as the target of the prediction when one uses a T days ahead prediction model. In addition, the first T' steps cannot be used as a feature since the moving average operation requires samples from the past T' steps. Therefore, the first T+T' steps of the data set are excluded from the training. In the present case, the first 62 steps were excluded and the length of the training data set was reduced to approximately seven months.

The skilled artisan will be able to apply a time-series cross validation (CV), such as a rolling forecasting origin, instead of the above simple use of the validation set, given a data set with sufficient length of time. It should be noted that, depending on the regression technique employed, the skilled artisan will be able to select appropriate hyper-parameters, given knowledge of the relevant domain and the teachings herein.

It is found that many of the proposed graph features improve the accuracy from the non-graph feature set for the prediction model of 7 days and 31 days ahead (T=7 and T=31).

Given the discussion thus far, it will be appreciated that, in general terms, an exemplary method, according to an aspect of the invention, includes the operations of obtaining input data 504 (operation 508); converting the input data 504 into a graph 400 (operation 512); based on the converted input data, generating a time series of snapshot graphs 400 (operation 520) by selecting edges 424, 428 whose timestamps are in a given time window for each of a plurality of time windows, each edge 424, 428 having a corresponding attribute; computing internal flow probabilities for each snapshot graph of the time series of snapshot graphs 400 (operation 536); and controlling a system based on the internal flow probabilities.

In one aspect, a non-transitory computer readable medium comprises computer executable instructions which when executed by a computer cause the computer to perform the method of obtaining input data 504 (operation 508); converting the input data 504 into a graph 400 (operation 512); based on the converted input data, generating a time series of snapshot graphs 400 (operation 520) by selecting edges 424, 428 whose timestamps are in a given time window for each of a plurality of time windows, each edge 424, 428 having a corresponding attribute; computing internal flow probabilities for each snapshot graph of the time series of snapshot graphs 400 (operation 536); and controlling a system based on the internal flow probabilities.

In one aspect, a shared-memory graph analysis platform based on a graph computer comprises a memory and at least one processor, coupled to the memory, and operative to perform operations comprising obtaining input data 504 (operation 508); converting the input data 504 into a graph 400 (operation 512); based on the converted input data, generating a time series of snapshot graphs 400 (operation 520) by selecting edges 424, 428 whose timestamps are in a given time window for each of a plurality of time windows, each edge 424, 428 having a corresponding attribute; computing internal flow probabilities for each snapshot graph of the time series of snapshot graphs 400 (operation 536); and controlling a system based on the internal flow probabilities.

In one example embodiment, aggregated features are computed from the internal flow probabilities (operation 544); a model is trained based on the aggregated features (operation 564); and a future effect of internal flows is predicted using the trained model (operation 572), wherein controlling the system is based on the predicted future effect of the internal flows.

In one example embodiment, the edge attributes and one or more attributes of nodes of the snapshot graph 400 are maintained in memory for direct access by using compact representations of the edge attributes and the node attributes.

In one example embodiment, message-passing-based or a vertex-centric BSP algorithm are used for each node.

In one example embodiment, other features are computed from the internal flow probabilities (operation 548) and the training of the model is further based on the other computed features. For example, these other features can be in addition to the aggregated features. Generally, those features can be used in addition to the internal flow feature in the case of a node-level prediction, as well as in the case of a graph-level prediction with the aggregated features.

In one example embodiment, a model is trained based on the internal flow probabilities (operation 564); and a future effect of internal flows is predicted using the trained model (operation 572), where controlling the system is based on the predicted future effect of the internal flows.

In one example embodiment, the input data 504 comprises account data, an account subset $L \subseteq$ an internal account set, a time series of a prediction target $\{f(t')|t' <= t\}$, and hyper-parameters comprising a time window size W, a prediction length T, and a maximum number of hops $n_{max}$.

In one example embodiment, in the time series of snapshot graphs $\{snapshot\ graph(t)|t <= t'\}$ 400, each internal vertex corresponds to an internal account of a bank and each of the selected edges 424, 428 corresponds to a transaction and has a timestamp attribute and an amount attribute.

In one example embodiment, the trained model is model $M_T$ for a prediction length T.

In one example embodiment, the computing the internal flow probabilities further comprises computing an edge weight for each edge 424, 428 of each vertex of the graph 400 (operation 620); initializing an in 0-hop probability and an out 0-hop probability for each internal vertex of the graph 400 (operation 636); computing an in n-hop probability and an out n-hop probability for each internal vertex of the graph 400 and for each value of n between one and a maximum value of n (operation 656); and outputting the in n-hop probabilities and the out n-hop probabilities to generate feature data 676 (operation 672). Regarding this generated feature data, refer to the above discussion re "these other features"; similar comments apply here as well.

In one example embodiment, a vertex-level feature of a given vertex in the graph 400 is computed, wherein the vertex-level feature corresponds to an n-hop probability of a random walker to or from the given vertex, wherein a probability of the random walker depends on an edge attribute of an edge which is connected to a vertex and wherein the probability of the random walker depends on a membership of vertices on both ends of the edge which is connected to the vertex, wherein the vertex belongs to a specific subset of vertices in the graph 400 of a plurality of subsets. Regarding the vertex-level feature, refer to the above discussion re "these other features"; similar comments apply here as well.

In one example embodiment, a graph-level feature of a graph 400 which is based on vertex-level features of vertices in the graph 400 is computed by aggregating the vertex-level features with weights, wherein each weight depends on a corresponding vertex, wherein each weight depends on a membership of vertices on both ends of an edge, and wherein a sign of each weight depends on a type of a random walk.

In one example embodiment, controlling the system includes cash flow control of a bank based on the internal flow probabilities (operation 580).

In one example embodiment, controlling the system includes account-level or customer-level cash flow control of a bank based on the internal flow probabilities (operation 580).

In one example embodiment, controlling the system includes detecting and mitigating financial fraud based on the internal flow probabilities (operation 580)

In one example embodiment, controlling the system includes detecting and mitigating money laundering based on the internal flow probabilities (operation 580).

The control can be based directly on the internal flow probabilities or on the predicted future effect from the model, rather than directly.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
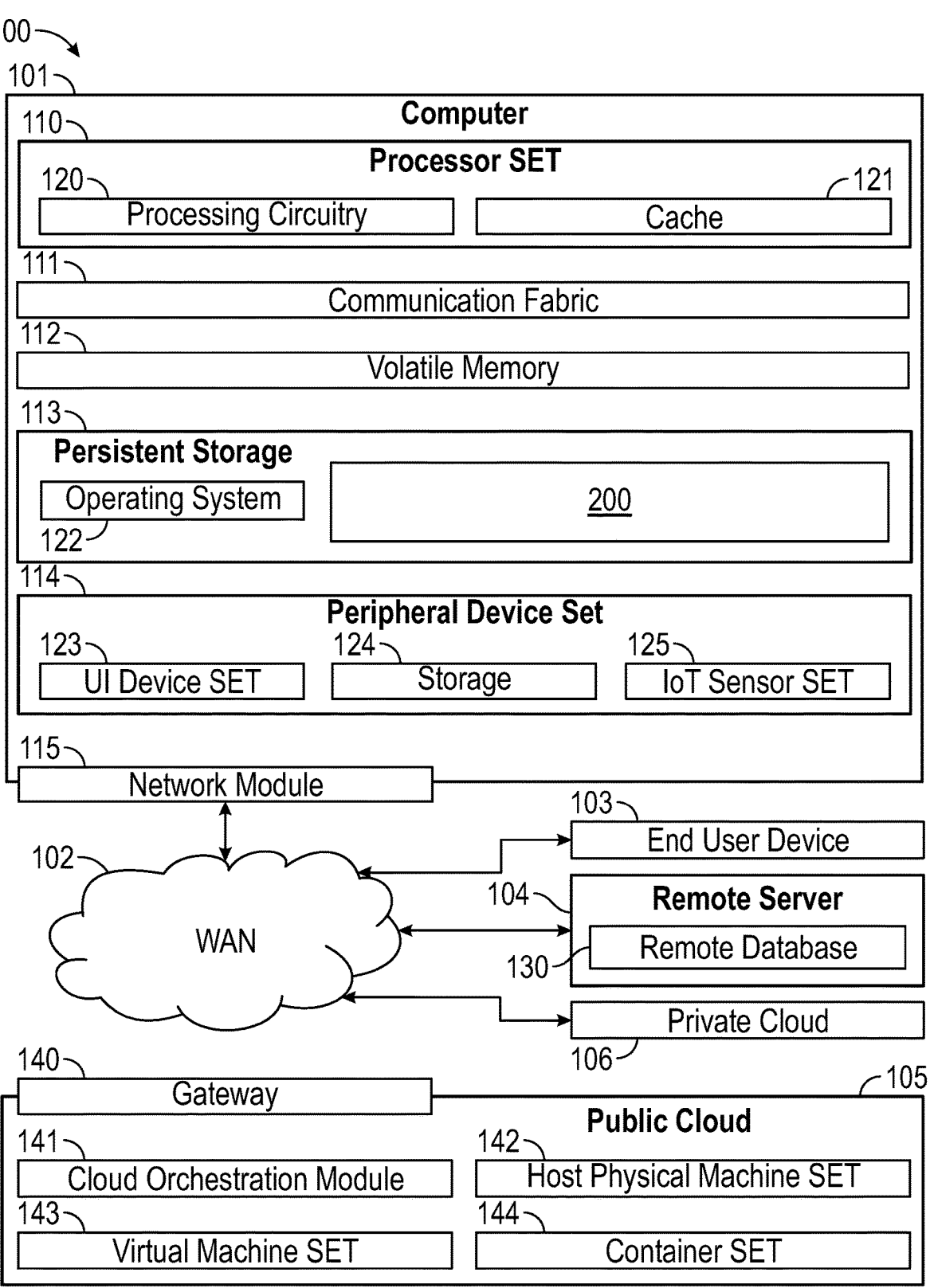
FIG. 8 depicts a computer system that may be useful in implementing one or more aspects and/or elements of the invention, also representative of a cloud computing node according to an embodiment of the present invention.

Referring now to FIG. 8, computing environment 100 contains an example of an environment for the execution of at least some of the computer code involved in performing the inventive methods, such as generating a prediction and generating feature data 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

obtaining input data;

converting the input data into a graph;

based on the converted input data, generating a time series of snapshot graphs by selecting edges whose time-stamps are in a given time window for each of a plurality of time windows, each edge having a corresponding attribute;

computing internal flow probabilities for each snapshot graph of the time series of snapshot graphs;

controlling a system based on the internal flow probabilities;

training a machine learning banking model based on the internal flow probabilities;

predicting a future effect of internal cash flows using the trained machine learning banking model; and detecting, based on the predicted effect, unusual flows of funds that can be indicative of financial hacking and wherein the controlling of the system further comprises adjusting a configuration of a network firewall to trigger a blocking of malicious network traffic associated with the detected unusual flows of funds, wherein the controlling of the system uses the predicted future effect of the internal cash flows to manage a banking system, and wherein the computing of the internal flow probabilities further comprises:

computing an edge weight for each edge of each vertex of the snapshot graph;

initializing an in 0-hop probability and an out 0-hop probability for each internal vertex of the graph;

computing an in n-hop probability and an out n-hop probability for each internal vertex of the graph and for each value of n between one and a maximum value of n, wherein the in n-hop probability is a conditional probability of random walkers walking only on internal vertices for n hops with a condition that the random walkers originate from external vertices at a beginning and arrive at a vertex v after the n hops and wherein the out n-hop out-flow probability is a conditional probability of random walkers walking only on internal vertices for n hops with a condition that the random walkers originate from vertex v and escape to external vertices after the n hops; and outputting the in n-hop probabilities and the out n-hop probabilities to generate feature data.

2. The computer-implemented method of claim 1, further comprising:

computing aggregated features from the internal flow probabilities, wherein the training of the machine learning banking model is based on the aggregated features; and predicting a future effect of internal flows using the trained machine learning banking model;

wherein controlling the system uses the predicted future effect of the internal flows.

3. The computer-implemented method of claim 2, further comprising computing other features from the internal flow probabilities and wherein the training of the machine learning banking model is further based on the other computed features.

4. The computer-implemented method of claim 2, further comprising computing a vertex-level feature of a given vertex in the graph, wherein the vertex-level feature corresponds to an n-hop probability of a random walker to or from the given vertex, wherein a probability of the random walker depends on an edge attribute of an edge which is connected to the given vertex and wherein the probability of the random walker depends on a membership of vertices on both ends of the edge which is connected to the given vertex, wherein the vertex belongs to a specific subset of vertices in the graph of a plurality of subsets.

5. The computer-implemented method of claim 1, further comprising maintaining the edge attributes and one or more attributes of nodes of the snapshot graph in memory for direct access by using compact representations of the edge attributes and the node attributes.

6. The computer-implemented method of claim 1, further comprising using message-passing-based or a vertex-centric bulk synchronous parallel algorithm for each node.

7. The computer-implemented method of claim 1, further comprising computing a graph-level feature based on vertex-level features of the vertices in the graph by aggregating the vertex-level features with weights, wherein each weight depends on a corresponding vertex, wherein each weight depends on a membership of vertices on both ends of an edge, and wherein a sign of each weight depends on a type of a random walk.

8. The computer-implemented method of claim 1, wherein the input data comprises account data, an account subset $L \subseteq$ an internal account set, a time series of a prediction target $\{f(t')|t'<=t\}$, and hyper-parameters comprising a time window size W, a prediction length T, and a maximum number of hops $n_{max}$.

9. The computer-implemented method of claim 1, wherein, in the time series of snapshot graphs $\{$snapshot graph $(t)|t<=t'\}$, each internal vertex corresponds to an internal account of a bank and each of the selected edges corresponds to a transaction and has a timestamp attribute and an amount attribute.

10. The computer-implemented method of claim 1, wherein the trained machine learning banking model comprises model MT for a prediction length T.

11. A non-transitory computer readable medium comprising computer executable instructions which when executed by a computer cause the computer to perform a method of:

obtaining input data;

converting the input data into a graph;

based on the converted input data, generating a time series of snapshot graphs by selecting edges whose timestamps are in a given time window for each of a plurality of time windows, each edge having a corresponding attribute;

computing internal flow probabilities for each snapshot graph of the time series of snapshot graphs;

controlling a system based on the internal flow probabilities;

training a machine learning banking model based on the internal flow probabilities;

predicting a future effect of internal cash flows using the trained machine learning banking model; and detecting, based on the predicted effect, unusual flows of funds that can be indicative of financial hacking and wherein the controlling of the system further comprises adjusting a configuration of a network firewall to trigger a blocking of malicious network traffic associated with the detected unusual flows of funds, wherein the controlling of the system uses the predicted future effect of the internal cash flows to manage a banking system, and wherein the computing of the internal flow probabilities further comprises:

computing an edge weight for each edge of each vertex of the snapshot graph;

initializing an in 0-hop probability and an out 0-hop probability for each internal vertex of the graph;

computing an in n-hop probability and an out n-hop probability for each internal vertex of the graph and for each value of n between one and a maximum value of n, wherein the in n-hop probability is a conditional probability of random walkers walking only on internal vertices for n hops with a condition that the random walkers originate from external vertices at a beginning and arrive at a vertex v after the n hops and wherein the out n-hop out-flow probability is a conditional probability of random walkers walking only on internal vertices for n hops with a condition that the random walkers originate from vertex v and escape to external vertices after the n hops; and outputting the in n-hop probabilities and the out n-hop probabilities to generate feature data.

12. A shared-memory graph analysis platform based on a graph computer comprising:

a memory; and at least one processor, coupled to said memory, and operative to perform operations comprising:

obtaining input data;

converting the input data into a graph;

based on the converted input data, generating a time series of snapshot graphs by selecting edges whose timestamps are in a given time window for each of a plurality of time windows, each edge having a corresponding attribute;

computing internal flow probabilities for each snapshot graph of the time series of snapshot graphs;

controlling a system based on the internal flow probabilities;

training a machine learning banking model based on the internal flow probabilities;

predicting a future effect of internal cash flows using the trained machine learning banking model; and detecting, based on the predicted effect, unusual flows of funds that can be indicative of financial hacking and wherein the controlling of the system further comprises adjusting a configuration of a network firewall to trigger a blocking of malicious network traffic associated with the detected unusual flows of funds, wherein the controlling of the system uses the predicted future effect of the internal cash flows to manage a banking system, and wherein the computing of the internal flow probabilities further comprises:

computing an edge weight for each edge of each vertex of the snapshot graph;

initializing an in 0-hop probability and an out 0-hop probability for each internal vertex of the graph;

computing an in n-hop probability and an out n-hop probability for each internal vertex of the graph and for each value of n between one and a maximum value of n, wherein the in n-hop probability is a conditional probability of random walkers walking only on internal vertices for n hops with a condition that the random walkers originate from external vertices at a beginning and arrive at a vertex v after the n hops and wherein the out n-hop out-flow probability is a conditional probability of random walkers walking only on internal vertices for n hops with a condition that the random walkers originate from vertex v and escape to external vertices after the n hops; and outputting the in n-hop probabilities and the out n-hop probabilities to generate feature data.

13. The shared-memory graph analysis platform of claim 12, the operations further comprising:

computing aggregated features from the internal flow probabilities, wherein the training of the machine learning banking model is based on the aggregated features; and predicting a future effect of internal flows using the trained machine learning banking model;

wherein controlling the system is based on the predicted future effect of the internal flows.

14. The shared-memory graph analysis platform of claim 13, the operations further comprising computing other features from the internal flow probabilities and wherein the training of the machine learning banking model is further based on the other computed features.

15. The shared-memory graph analysis platform of claim 12, the operations further comprising maintaining the edge attributes and one or more attributes of nodes of the snapshot graph in memory for direct access by using compact representations of the edge attributes and the node attributes.

16. The shared-memory graph analysis platform of claim 12, the operations further comprising using message-passing-based or a vertex-centric bulk synchronous parallel algorithm for each node.

17. The shared-memory graph analysis platform of claim 12, the operations further comprising:

training a machine learning model based on the internal flow probabilities; and predicting a future effect of internal flows using the trained machine learning banking model;

wherein controlling the system is based on the predicted future effect of the internal flows.

* * * * *